(12) United States Patent
Andrews

(10) Patent No.: US 11,407,283 B2
(45) Date of Patent: Aug. 9, 2022

(54) CAB HEATING SYSTEMS AND METHODS FOR VEHICLES

(71) Applicant: Tiger Tool International Incorporated, Abbotsford (CA)

(72) Inventor: Michael Andrews, Bellingham, WA (US)

(73) Assignee: TIGER TOOL INTERNATIONAL INCORPORATED, Abbotsford (CA)

( * ) Notice: Subject to any disclaimer, the term of this patent is extended or adjusted under 35 U.S.C. 154(b) by 191 days.

(21) Appl. No.: 16/393,787

(22) Filed: Apr. 24, 2019

(65) Prior Publication Data
US 2019/0329629 A1    Oct. 31, 2019

Related U.S. Application Data

(60) Provisional application No. 62/664,459, filed on Apr. 30, 2018.

(51) Int. Cl.
*B60H 1/22* (2006.01)
*B60H 1/00* (2006.01)
(Continued)

(52) U.S. Cl.
CPC .......... *B60H 1/22* (2013.01); *B60H 1/00357* (2013.01); *B60H 1/00557* (2013.01); *B60H 1/20* (2013.01);
(Continued)

(58) Field of Classification Search
CPC .. B60H 1/22; B60H 1/00357; B60H 1/00557; B60H 1/3204; B60H 2001/2271;
(Continued)

(56) References Cited

U.S. PATENT DOCUMENTS

| | | | | |
|---|---|---|---|---|
| 2,521,393 A | * | 9/1950 | Messinger | B64D 13/08 237/2 A |
| 2,961,939 A | * | 11/1960 | Typaldos | B64D 13/06 454/71 |

(Continued)

FOREIGN PATENT DOCUMENTS

| | | |
|---|---|---|
| AE | 5258 | 7/2016 |
| AU | 201613490 S | 7/2016 |

(Continued)

OTHER PUBLICATIONS

Apucenter.com, Auxiliary Power Units—Service—Parts, Comfort Master, https://web.archive.org/web/20140111100715/http:/lapucenter.com/, Jan. 11, 2014, 2 pages.

(Continued)

*Primary Examiner* — Steven B McAllister
*Assistant Examiner* — Daniel E. Namay
(74) *Attorney, Agent, or Firm* — Schacht Law Office, Inc.; Michael R. Schacht

(57) ABSTRACT

A cab heating system for a vehicle comprising a turbine engine, a heat exchanger, and a duct. The turbine engine generates exhaust containing waste heat. The heat exchanger comprises a first portion, a second portion, and first and second lines for carrying auxiliary working fluid between the first and second portions. The duct is operatively connected to carry exhaust from the turbine engine to the first portion of the heat exchanger. The first portion of the heat exchanger transfers waste heat of the exhaust generated by the turbine engine to the auxiliary working fluid. The first line carries the auxiliary working fluid to the second portion of the heat exchanger. The heat exchanger extracts heat from the auxiliary working fluid. The second line carries the auxiliary working fluid to the first portion of the heat exchanger.

18 Claims, 5 Drawing Sheets

(51) Int. Cl.
*B60H 1/20* (2006.01)
*B60H 1/32* (2006.01)

(52) U.S. Cl.
CPC .............. *B60H 2001/2271* (2013.01); *B60H 2001/2281* (2013.01)

(58) Field of Classification Search
CPC .. B60H 2001/2281; B60H 2001/00121; B60H 2001/003; B60H 2001/00307; B60H 1/025; B60H 1/03; B60H 1/08; B60H 1/20; B64D 2013/0648; B64D 2013/0611; B64D 2013/064; B64D 2013/0688; B60D 15/04; B60D 2033/024
USPC .... 237/12.3 R, 12.3 A, 12.3 C, 12.3; 60/697
See application file for complete search history.

(56) References Cited

U.S. PATENT DOCUMENTS

| | | |
|---|---|---|
| 3,065,381 A | 11/1962 | Kyle |
| 3,290,576 A | 12/1966 | Jensen et al. |
| 3,583,156 A * | 6/1971 | Schabert ............... G21D 5/08 376/391 |
| 3,663,364 A * | 5/1972 | Thompson ............. G21C 1/326 376/394 |
| 3,906,906 A | 9/1975 | Arai |
| D240,428 S | 7/1976 | Hoffman |
| 4,055,299 A * | 10/1977 | Norberg ............. F24D 11/0207 237/2 B |
| 4,217,764 A | 8/1980 | Armbruster |
| 4,280,330 A | 7/1981 | Harris et al. |
| 4,463,576 A | 8/1984 | Burnett et al. |
| 4,531,379 A | 7/1985 | Diefenthaler, Jr. |
| 4,602,485 A | 7/1986 | Fujimoto et al. |
| D287,264 S | 12/1986 | Rinaldo et al. |
| 4,630,775 A | 12/1986 | Mandon et al. |
| 4,648,356 A | 3/1987 | Hayashi |
| 4,825,663 A | 5/1989 | Nijjar et al. |
| 4,925,092 A * | 5/1990 | Yoshida ................... F02G 5/02 237/12.3 B |
| 4,947,657 A | 8/1990 | Kalmbach |
| D322,122 S | 12/1991 | Guetersloh et al. |
| D324,420 S | 3/1992 | Farce |
| D338,952 S | 8/1993 | Snow |
| 5,333,678 A | 8/1994 | Mellum et al. |
| 5,408,150 A | 4/1995 | Wilcox |
| 5,481,178 A | 1/1996 | Wilcox et al. |
| 5,701,755 A * | 12/1997 | Severson ................. B64D 13/00 62/402 |
| 5,705,919 A | 1/1998 | Wilcox |
| D393,703 S | 4/1998 | Gilbertson |
| 5,808,441 A | 9/1998 | Nehring |
| 5,896,750 A | 4/1999 | Karl |
| 5,901,780 A | 5/1999 | Zeigler et al. |
| 5,929,620 A | 7/1999 | Dobkin et al. |
| 6,116,513 A | 9/2000 | Perhats |
| 6,144,194 A | 11/2000 | Varga |
| 6,158,230 A | 12/2000 | Katsuki |
| 6,177,787 B1 | 1/2001 | Hobrecht |
| D453,560 S | 2/2002 | Van Brunt |
| 6,367,272 B1 | 4/2002 | Zeng et al. |
| D456,887 S | 5/2002 | Zlotnik |
| 6,427,465 B1 | 8/2002 | Bednarchik et al. |
| 6,460,356 B1 | 10/2002 | Tao et al. |
| 6,615,602 B2 | 9/2003 | Wilkinson |
| 6,651,759 B1 | 11/2003 | Gruenwald et al. |
| 6,801,842 B2 | 10/2004 | Egami et al. |
| 6,863,139 B2 | 3/2005 | Egami et al. |
| D532,893 S | 11/2006 | Wu |
| D536,078 S | 1/2007 | Leon |
| D536,079 S | 1/2007 | Leon |
| 7,181,918 B2 | 2/2007 | Reinders |
| D548,750 S | 8/2007 | Neeley et al. |
| 7,305,842 B1 * | 12/2007 | Schiff ................... B64D 13/06 62/244 |
| D575,381 S | 8/2008 | Leon |
| 7,430,874 B2 | 10/2008 | Prince et al. |
| 7,448,227 B2 | 11/2008 | Zeigler et al. |
| 7,579,801 B2 | 8/2009 | Mazaika |
| 7,762,062 B2 | 7/2010 | Opris |
| D630,310 S | 1/2011 | Beland et al. |
| D631,145 S | 1/2011 | Beland et al. |
| D644,320 S | 8/2011 | Virr et al. |
| D647,192 S | 10/2011 | Esteve et al. |
| D648,018 S | 11/2011 | Sordo |
| D663,816 S | 7/2012 | Tebe Poves et al. |
| 8,468,843 B2 | 6/2013 | Futernik et al. |
| 8,579,748 B2 | 11/2013 | Kawasaki et al. |
| D698,431 S | 1/2014 | Garbusi et al. |
| D723,674 S | 3/2015 | Zaari |
| 9,102,225 B2 | 8/2015 | Major et al. |
| 9,291,191 B1 * | 3/2016 | Rejkowski ................ F16C 1/14 |
| D755,943 S | 5/2016 | Lanssky |
| 9,374,003 B1 | 6/2016 | Mcjimsey et al. |
| D762,830 S | 8/2016 | Lewis |
| D763,423 S | 8/2016 | Hewett et al. |
| D766,414 S | 9/2016 | Chu |
| D778,415 S | 2/2017 | Ogg |
| 9,669,936 B1 * | 6/2017 | Fiterman ............... B64D 13/06 |
| 9,701,175 B2 | 7/2017 | Miller et al. |
| D801,500 S | 10/2017 | Andrews |
| D801,501 S | 10/2017 | Andrews |
| 9,925,847 B2 * | 3/2018 | Andrews ............ B60H 1/00378 |
| 10,309,703 B2 | 6/2019 | Andrews |
| 10,384,785 B2 * | 8/2019 | Bruno .................... B64D 13/04 |
| 10,391,837 B2 * | 8/2019 | Andrews ............ B60H 1/00378 |
| 10,543,925 B2 * | 1/2020 | Bammann ............. B64D 13/08 |
| 10,843,804 B2 * | 11/2020 | Lo .......................... B64D 13/02 |
| 10,926,884 B2 * | 2/2021 | Bruno .................... B64D 13/08 |
| 11,135,892 B2 | 10/2021 | Andrews |
| 11,136,050 B2 * | 10/2021 | Frankenberger ... B61D 27/0018 |
| 2002/0070557 A1 | 6/2002 | Geis |
| 2002/0112490 A1 | 8/2002 | Gong |
| 2002/0157414 A1 | 10/2002 | Iwanami et al. |
| 2002/0189265 A1 | 12/2002 | Ferris et al. |
| 2003/0098148 A1 | 5/2003 | Mehraban et al. |
| 2003/0192952 A1 | 10/2003 | Horn et al. |
| 2003/0217559 A1 | 11/2003 | Ieda et al. |
| 2004/0025521 A1 | 2/2004 | Kubo et al. |
| 2004/0104578 A1 | 6/2004 | Wurtele |
| 2004/0168455 A1 | 9/2004 | Nakamura |
| 2005/0035657 A1 | 2/2005 | Brummett et al. |
| 2005/0044864 A1 | 3/2005 | Manole et al. |
| 2005/0053495 A1 | 3/2005 | Lebecq et al. |
| 2005/0166629 A1 * | 8/2005 | Axe ....................... B64D 13/06 62/401 |
| 2005/0193754 A1 | 9/2005 | Chang et al. |
| 2005/0217288 A1 * | 10/2005 | Uno ........................ B60H 1/32 62/157 |
| 2005/0241818 A1 | 11/2005 | Yakumaru et al. |
| 2005/0257545 A1 | 11/2005 | Ziehr et al. |
| 2006/0028871 A1 | 2/2006 | Suzuki |
| 2006/0042286 A1 | 3/2006 | Heberle et al. |
| 2006/0130469 A1 * | 6/2006 | Baeuerle ................. B60H 1/025 60/300 |
| 2006/0156761 A1 * | 7/2006 | Mola ................... B60H 1/3201 65/333 |
| 2006/0288713 A1 | 12/2006 | Knight et al. |
| 2007/0075695 A1 | 4/2007 | Gan et al. |
| 2007/0193291 A1 * | 8/2007 | Reddin ............... B60H 1/00357 62/239 |
| 2007/0204639 A1 | 9/2007 | Harrison |
| 2007/0289325 A1 | 12/2007 | Stone |
| 2009/0014150 A1 * | 1/2009 | Masters ............ B60H 1/32284 165/43 |
| 2009/0136387 A1 | 5/2009 | Picton et al. |
| 2009/0211280 A1 | 8/2009 | Alston |
| 2009/0228150 A1 | 9/2009 | Alston |
| 2009/0293522 A1 | 12/2009 | Miyazaki |
| 2010/0089563 A1 | 4/2010 | Sundhar et al. |
| 2010/0181138 A1 | 7/2010 | Khadiya et al. |
| 2010/0192548 A1 | 8/2010 | Irlbeck et al. |
| 2011/0067422 A1 | 3/2011 | Ichishi et al. |
| 2011/0114405 A1 | 5/2011 | Perhats |

(56) References Cited

U.S. PATENT DOCUMENTS

| | | | |
|---|---|---|---|
| 2011/0209490 A1 | 9/2011 | Mijanovic et al. | |
| 2011/0302942 A1 | 12/2011 | Birchard | |
| 2012/0031581 A1* | 2/2012 | Chillar | F01D 17/085 165/11.1 |
| 2013/0056992 A1 | 3/2013 | Wada et al. | |
| 2013/0118196 A1 | 5/2013 | Chen et al. | |
| 2013/0199217 A1 | 8/2013 | Arai et al. | |
| 2013/0227973 A1 | 9/2013 | Kang et al. | |
| 2013/0263574 A1* | 10/2013 | Levin | B60H 1/14 60/273 |
| 2013/0284524 A1 | 10/2013 | Collins | |
| 2014/0007605 A1 | 1/2014 | Schneider et al. | |
| 2014/0230470 A1 | 8/2014 | Cook | |
| 2014/0244107 A1 | 8/2014 | Delevski et al. | |
| 2014/0270240 A1 | 9/2014 | Solomon et al. | |
| 2014/0270242 A1 | 9/2014 | Cheung et al. | |
| 2015/0096313 A1* | 4/2015 | Ragazzi | B60H 1/00485 62/115 |
| 2015/0210141 A1* | 7/2015 | Ragazzi | B60H 1/00907 62/93 |
| 2015/0251520 A1* | 9/2015 | Andrews | B60H 1/00921 62/79 |
| 2015/0314669 A1* | 11/2015 | Noda | B60H 1/00921 62/324.1 |
| 2016/0089958 A1 | 3/2016 | Powell | |
| 2016/0111959 A1 | 4/2016 | Erickson, Jr. et al. | |
| 2016/0121899 A1 | 5/2016 | Wankhede | |
| 2016/0197534 A1 | 7/2016 | Walker et al. | |
| 2016/0238292 A1 | 8/2016 | Andrews | |
| 2016/0265819 A1* | 9/2016 | Durrani | B60H 1/00907 |
| 2016/0288619 A1 | 10/2016 | Andrews | |
| 2016/0368373 A1 | 12/2016 | Dudar et al. | |
| 2017/0015175 A1 | 1/2017 | Pursifull et al. | |
| 2017/0015176 A1 | 1/2017 | Ulrey et al. | |
| 2017/0070065 A1 | 3/2017 | Weflen | |
| 2017/0129614 A1* | 5/2017 | Bammann | B64D 13/02 |
| 2017/0158026 A1 | 6/2017 | Menard et al. | |
| 2017/0197492 A1 | 7/2017 | Ishizeki et al. | |
| 2017/0197678 A1 | 7/2017 | Scaringe | |
| 2017/0217286 A1* | 8/2017 | Tsukamoto | B60H 1/00978 |
| 2017/0229965 A1 | 8/2017 | Parto | |
| 2017/0305236 A1 | 10/2017 | Berkson et al. | |
| 2017/0341759 A1* | 11/2017 | Bruno | B64D 13/06 |
| 2018/0162377 A1 | 6/2018 | Colavincenzo et al. | |
| 2018/0215235 A1* | 8/2018 | Andrews | B60H 1/00378 |
| 2018/0215475 A1* | 8/2018 | Hurt | B64D 41/00 |
| 2018/0237144 A1* | 8/2018 | Bruno | B64D 13/06 |
| 2018/0266742 A1 | 9/2018 | Andrews | |
| 2019/0077216 A1 | 3/2019 | Andrews | |
| 2019/0162121 A1* | 5/2019 | Staubach | F02C 7/185 |
| 2019/0193524 A1 | 6/2019 | Stoltz | |
| 2019/0255912 A1* | 8/2019 | Ulrey | F01N 5/02 |
| 2019/0255913 A1* | 8/2019 | Ulrey | B60H 1/00821 |
| 2019/0256077 A1 | 8/2019 | Stoltz | |
| 2019/0283897 A1* | 9/2019 | D'Orlando | B64D 13/06 |
| 2019/0337627 A1* | 11/2019 | Bruno | B64D 13/04 |
| 2022/0048355 A1 | 2/2022 | Andrews | |

FOREIGN PATENT DOCUMENTS

| | | | |
|---|---|---|---|
| AU | 2015229661 B2 | 5/2019 | |
| AU | 2016243053 B2 | 5/2021 | |
| AU | 2017261902 B2 | 4/2022 | |
| CA | 2156940 A1 * | 2/1997 | F02C 3/10 |
| CA | 2939298 A1 | 9/2015 | |
| CA | 3004780 A1 | 8/2017 | |
| CA | 3015917 A1 | 11/2017 | |
| CA | 2939298 C | 4/2019 | |
| CA | 3041378 A1 | 10/2019 | |
| CA | 3041378 A1 * | 10/2019 | B60H 1/00357 |
| CA | 3102595 A1 | 12/2019 | |
| CA | 3103426 A1 | 12/2019 | |
| CN | 202926544 U | 5/2013 | |
| CN | 103303098 A | 9/2013 | |
| CN | 103363603 A | 10/2013 | |
| CN | 203623404 U | 6/2014 | |
| CN | 104713260 A | 6/2015 | |
| CN | 104919259 A | 9/2015 | |
| CN | 106414122 A | 2/2017 | |
| CN | 109383222 A | 2/2019 | |
| DE | 3031218 A1 * | 4/1982 | B60H 1/2203 |
| DE | 20023686 U1 * | 7/2005 | F02C 6/18 |
| DE | 102009048719 A1 | 4/2011 | |
| EP | 1123823 A2 * | 8/2001 | F02C 6/20 |
| EP | 1219478 B1 | 7/2002 | |
| EP | 2100494 A2 | 9/2009 | |
| EP | 2897270 A1 | 7/2015 | |
| EP | 3277529 A4 | 12/2018 | |
| EP | 3408117 A4 | 9/2019 | |
| EP | 3455095 B1 | 11/2021 | |
| FR | 2995014 B1 | 9/2014 | |
| FR | 3040563 B1 | 11/2019 | |
| GB | 871877 A * | 7/1961 | F25B 9/004 |
| GB | 910896 A * | 11/1962 | F25B 9/004 |
| JP | 63166619 A * | 7/1988 | B60H 1/2212 |
| JP | 04123924 A * | 4/1992 | |
| JP | 2621547 B | 6/1997 | |
| JP | H11301255 A | 11/1999 | |
| JP | 2005212735 A * | 8/2005 | B60H 1/3201 |
| JP | 2006298283 A | 11/2006 | |
| JP | 2007297965 A * | 11/2007 | |
| JP | 2008081078 A | 4/2008 | |
| JP | 2009184621 A | 8/2009 | |
| JP | 2013217340 A * | 10/2013 | |
| JP | 2018077003 A * | 5/2018 | F25B 1/10 |
| JP | 2020015414 A * | 1/2020 | B60H 1/32 |
| JP | 2020026197 A * | 2/2020 | B60H 1/22 |
| JP | 2020185969 A * | 11/2020 | H01M 10/615 |
| KR | 20080010646 A | 1/2008 | |
| RU | 2146034 C1 | 2/2000 | |
| RU | 2157037 C1 | 9/2000 | |
| RU | 2425436 C2 * | 7/2011 | |
| RU | 2516912 C1 | 5/2014 | |
| RU | 2571895 C1 | 12/2015 | |
| SA | 5473 | 7/2016 | |
| SU | 634976 A1 | 11/1978 | |
| SU | 1558311 A3 | 4/1990 | |
| WO | 2007111905 A2 | 10/2007 | |
| WO | WO-2013180282 A1 * | 12/2013 | B60H 1/20 |
| WO | 2015065643 A1 | 5/2015 | |
| WO | 2015097457 A1 | 7/2015 | |
| WO | 2015138352 A1 | 9/2015 | |
| WO | 2016006278 A1 | 1/2016 | |
| WO | 2016161447 A1 | 10/2016 | |
| WO | 2017132260 A1 | 8/2017 | |
| WO | 2017197407 A1 | 11/2017 | |
| WO | 2018009406 A1 | 1/2018 | |

OTHER PUBLICATIONS

Bergstrom, Bergstrom NITE No-Idle, https://web.archive.org/web/20140207093405/http://us.bergstrominc.com/nite-no-idle/, Feb. 7, 2014, 1 page.

Climacab Crosspoint Solutions, ClimaCab 3.0 APU, Product Overview and Brochure, http://www.crosspointsolutionsgroup.com/climacab/product/climacab-apu.html, 2012, 6 pages.

Cool-It, 12V No-Idle Split A/C System, Product Overview and Brochure, http://cool-it.ca/?s=12+volt+no+idle+system, 2012, 8 pages.

DC Airco, High Efficiency Direct Current Air Conditioners, https://web.archive.org/web/20130825041413/http://dcairco.com/index.php/products/trucks, Aug. 25, 2013, 3 pages.

Dometic Group, Dometic Showcases Expanded Line of HVAC Systems for Day Cabs, http://www.2.dometic.com/enus/Americas/USA/Truck-News/Dometic-Showcases-Expanded-Line-of-HVAC-Systems-For-Day-Cabs/, 2010, 1 page.

Hammond Air Conditioning Ltd., Arctic Breeze Truck AC: 12V/DC air conditioning keeps cabs cool without wasting fuel, https://web.archive.org/web/20140108111758/http://www.arcticbreeze-truckac.com/, Jan. 8, 2014, 1 page.

Idle Free Systems, Inc., Systems for all driving conditions, budgets, and investment timelines, http://dlefreesystems.com/no-idle-elimination-systems-battery-reffer-busses.html, 2010-2011, 1 page.

(56) References Cited

OTHER PUBLICATIONS

Indel B, Sleeping Well, https://web.archive.org/web/20130530064452/http://www.indelb.com/products/truck_air_conditioning/sleeping_well, May 30, 2013, 2 pages.
International Searching Authority, ISR & Written Opinion, PCT/US2015019523, dated Jun. 10, 2015, 7 pages.
International Searching Authority, ISR & Written Opinion, PCT/US2016/025923, dated Sep. 8, 2016, 7 pages.
International Searching Authority, ISR & Written Opinion, PCT/US2017/032750, dated Aug. 24, 2017, 7 pages.
International Searching Authority, Written Opinion & ISR, PCT/US2017/014941, dated Apr. 20, 2017, 7 pages.
Rigmaster Power, The Ultimate Stand-Alone Truck Mounted APU, http://rigmasterpower.com, 2011, 1 page.
Thermo King, APU Tripac Evolution, Product Overview and Brochure, http://www.na.thermoking.com/tk-innovation/global/en/products/apu.html, 2011, 9 pages.
CIPO, "Notification of the First Office Action", Application No. 201580012907.2, dated Apr. 27, 2018, 8 pages.
International Searching Authority, ISR & Written Opinion, PCT/US/2020062395, P220006pct, dated Feb. 25, 2021 44 pages.
International Search Authority, ISR, PCT/US2021039834, dated Oct. 14, 2021, 2 pages.
International Searching Authority, ISR & Written Opinion, PCT/US2018/055510, P219545pct, dated Dec. 27, 2018, 9 pages.
USPTO, "Final Office Action, U.S. Appl. No. 15/047,442, P218764", dated Feb. 14, 2018, 15 pages.
USPTO, "Final Office Action, U.S. Appl. No. 15/090,455, P218795", dated Aug. 30, 2018, 18 pages.
USPTO, "Final Office Action, U.S. Appl. No. 15/090,455, P218795", dated Dec. 22, 2021, 44 pages.
USPTO, "Non-Final Office Action, U.S. Appl. No. 15/047,442, P218764", dated Aug. 10, 2017, 6 pages.
USPTO, "Non-Final Office Action, U.S. Appl. No. 14/642,601, P218435", dated Jun. 16, 2017, 9 pages.
USPTO, "Non-Final Office Action, U.S. Appl. No. 15/090,455, P218795," dated Jan. 18, 2018, 29 pages.
USPTO, "Non-Final Office Action, U.S. Appl. No. 15/090,455, P218795," dated Mar. 19, 2019, 17 pages.
USPTO, "Non-Final Office Action, U.S. Appl. No. 15/936,747, P219422," dated Sep. 13, 2018, 13 pages.

* cited by examiner

CAB HEATING SYSTEMS AND METHODS FOR VEHICLES

RELATED APPLICATIONS

This application, U.S. patent application Ser. No. 16/393,787 filed Apr. 24, 2019 claims benefit of U.S. Provisional Application Ser. No. 62/664,459 filed Apr. 30, 2018, the contents of which are incorporated herein by reference.

TECHNICAL FIELD

The present invention relates to heating systems for use on movable structures such as vehicles and, in particular, to a heating system for a cab of a vehicle that employs waste heat from an onboard turbine.

BACKGROUND

Utility power is typically made available as an AC power signal distributed from one or more centralized sources to end users over a power distribution network. However, utility power is unavailable for certain structures. For example, movable structures such as vehicles do not have access to utility power when moving and cannot be easily connected to a power distribution network when parked. Similarly, remote structures such as cabins and military installations not near the utility power distribution network often cannot be practically powered using utility power.

DC power systems including batteries are often employed to provide power when utility power is unavailable. For example, trucks and boats typically employ a DC power system including a battery array to provide power at least to secondary vehicle electronics systems such as communications systems, navigation systems, ignition systems, heating and cooling systems, and the like. Shipping containers and remote cabins that operate using alternative primary power sources such as solar panels or generators also may include DC power systems including a battery or array of batteries to operate electronics systems when primary power is unavailable. Accordingly, most modern vehicles and remote structures use battery power sufficient to operate, at least for a limited period of time, electronics systems such as secondary vehicle electronics systems.

The capacity of a battery system used by a vehicle or remote structure is typically limited by factors such as size, weight, and cost. For example, a vehicle with an internal combustion engine may include a relatively small battery for use when the engine is not operating; a large battery array is impractical for vehicles with an internal combustion engine because the size of the batteries takes up valuable space and the weight of the batteries reduces vehicle efficiency when the vehicle is being moved by the engine. All electric vehicles have significantly greater battery capacity, but that battery capacity is often considered essential for the primary purpose of moving the vehicle, so the amount of battery capacity that can be dedicated to secondary vehicle electronics systems is limited. Battery systems employed by remote structures must be capable of providing power when the alternative power source is unavailable, but factors such as cost, size, and weight reduce the overall power storage capacity of such systems.

Heating and cooling systems have substantial energy requirements. Vehicles such as trucks or boats typically rely on the availability of the internal combustion engine when heating or cooling is required. When heating or cooling is required when the vehicle is parked or the boat is moored for more than a couple of minutes, the internal combustion engine will be operated in an idle mode solely to provide power to the heating and cooling system. Engine idling is inefficient and creates unnecessary pollution, and anti-idling laws are being enacted to prevent the use of idling engines, especially in congested environments like cities, truck stops, and harbors. For remote structures such as cabins or shipping containers, heating and cooling systems can be a major draw on battery power. Typically, an alternative or inferior heating or cooling source such as a wood burning stove, fans, or the like are used instead of a DC powered heating and cooling system.

The need thus exists for heating and cooling systems that operate using DC power having improved efficiency to optimize the use of battery power.

SUMMARY

The present invention may be embodied as a cab heating system for a vehicle comprising a turbine engine, a heat exchanger, and a duct. The turbine engine generates exhaust containing waste heat. The heat exchanger comprises a first portion, a second portion, and first and second lines for carrying auxiliary working fluid between the first and second portions. The duct is operatively connected to carry exhaust from the turbine engine to the first portion of the heat exchanger. The first portion of the heat exchanger transfers waste heat of the exhaust generated by the turbine engine to the auxiliary working fluid. The first line carries the auxiliary working fluid to the second portion of the heat exchanger. The heat exchanger extracts heat from the auxiliary working fluid. The second line carries the auxiliary working fluid to the first portion of the heat exchanger The present invention may also be embodied as a method of heating a cab of a vehicle comprising the following steps. A turbine engine and a heat exchanger are provided. The heat exchanger comprises a first portion and a second portion. A duct is operatively connected to carry exhaust from the turbine engine to the first portion of the heat exchanger. The turbine engine is operated to generate exhaust containing waste heat such that the first portion of the heat exchanger transfers waste heat of the exhaust generated by the turbine engine to auxiliary working fluid. The auxiliary working fluid is caused to flow to the second portion of the heat exchanger. Heat is extracted from the auxiliary working fluid. The auxiliary working fluid is caused to flow to the first portion of the heat exchanger.

A vehicle heating and cooling system comprising a turbine engine generator, a heat exchanger, a compressor, an evaporator, and a duct. The turbine engine generator generates electricity and exhaust containing waste heat. The heat exchanger comprises a first portion and a second portion. The duct is operatively connected to carry exhaust from the turbine engine to the first portion of the heat exchanger. The first portion of the heat exchanger transfers waste heat of the exhaust generated by the turbine engine to auxiliary working fluid. The auxiliary working fluid flows from the first portion to the second portion of the heat exchanger. The second portion of the heat exchanger transfers heat from the auxiliary working fluid to main working fluid flowing between the compressor and the evaporator. The auxiliary working fluid flows from the second portion to the first portion of the heat exchanger.

DETAILED DESCRIPTION

Several examples of the vehicle heating systems constructed in accordance with the present invention will be described separately below. In particular, a first example will be disclosed with reference to FIG. 1, a second example will be disclosed with reference to FIGS. 2A and 2B, and a third example will be described with reference to FIGS. 3A and 3B below.

In this application, the term "vehicle" refers to a movable structure when that structure is not connected to utility power either when being moved or when stationary and having electronics systems that operate on vehicle (DC) power. Examples of vehicles include trucks, automobiles, shipping containers, and boats. The present invention is of particular significance when applied to vehicles but may also have application to any structure, whether fixed or movable, that does not have access to utility power at least a portion of the time and is designed to operate primarily on DC power. The term "remote structure" will be used herein to refer to such structures.

I. First Example Vehicle Heating System

Figure 1:
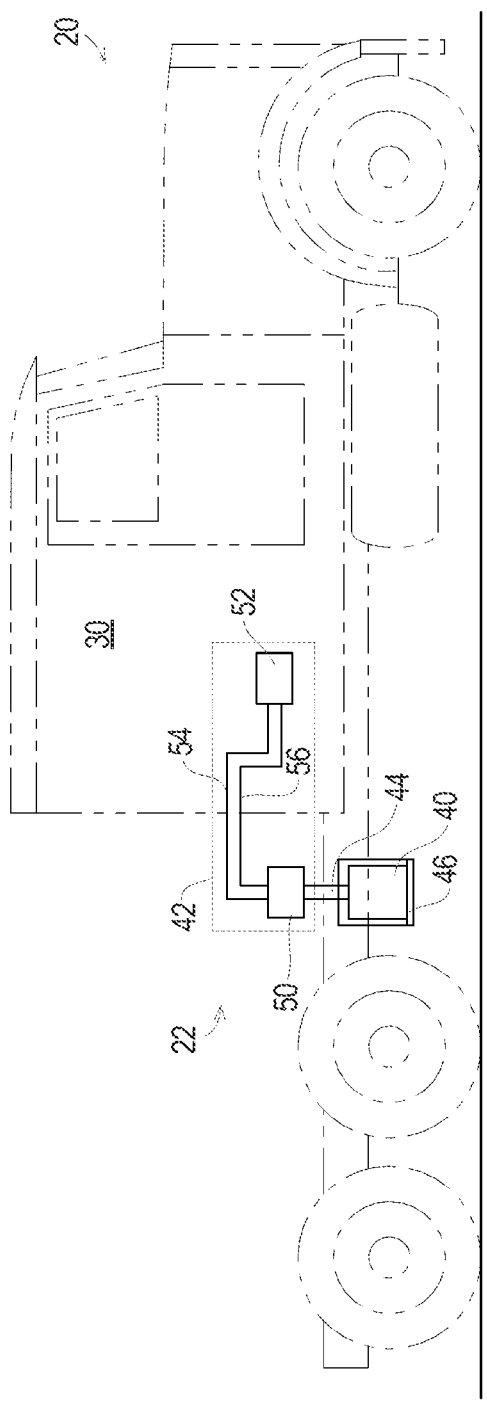
FIG. 1 is a highly schematic side elevation view depicting a first example cab heating system of the present invention mounted on a vehicle.

Depicted in FIG. 1 of the drawing is a vehicle 20 carrying a first example vehicle heating and cooling system 22 constructed in accordance with, and embodying, the principles of the present invention. The example vehicle 20 is or may be a conventional tractor adapted to pull a trailer (not shown) carrying goods.

The example vehicle 20 defines a cab area 30 in which a driver (not shown) sits. The first example vehicle heating and cooling system 22 comprises a turbine engine 40 and a heat exchanger system 42. A duct 44 is operatively connected between the turbine engine 40 and the heat exchanger system 42. A housing 46 supported by the vehicle 20 outside of the cab area 30 contains the turbine engine 42. The turbine engine 40 may be configured as a generator to generate electricity to supplement electricity generated by a main engine (not shown) of the vehicle 20 or when the main engine of the vehicle 20 is not operational.

The example heat exchanger system 42 comprises a first portion 50 and a second portion 52. First and second lines 54 and 56 carry working fluid in-between the first portion 50 and the second portion 52. When heat is transferred to the cab area 30, the example heat exchanger system 42 transfers waste heat from the turbine engine 40 through the duct 44 and around the first portion 50 of the heat exchanger system 42 such that heat is transferred to the working fluid within the first portion 50. The heated working fluid is caused to flow (e.g., pumped) through the first line 54, to the second portion 52 where heat is extracted, and back to the first portion 50 through the second line 56 for reheating.

The second portion of the example heat exchanger system 42 is configured to transfer waste heat from the turbine engine 40 to the cab area 30 to enhance the comfort of the driver. Typically, but not necessarily, the heat exchanger system 42 is operatively connected to a conventional cab HVAC system (not shown in FIG. 1) capable of both transferring heat to and removing heat from the cab area 30. When connected to a conventional cab HVAC system, the example heat exchanger system 42 is configured to supply auxiliary heat to the cab HVAC system in the heating mode.

II. Second Example Vehicle Heating System

Figure 2A:
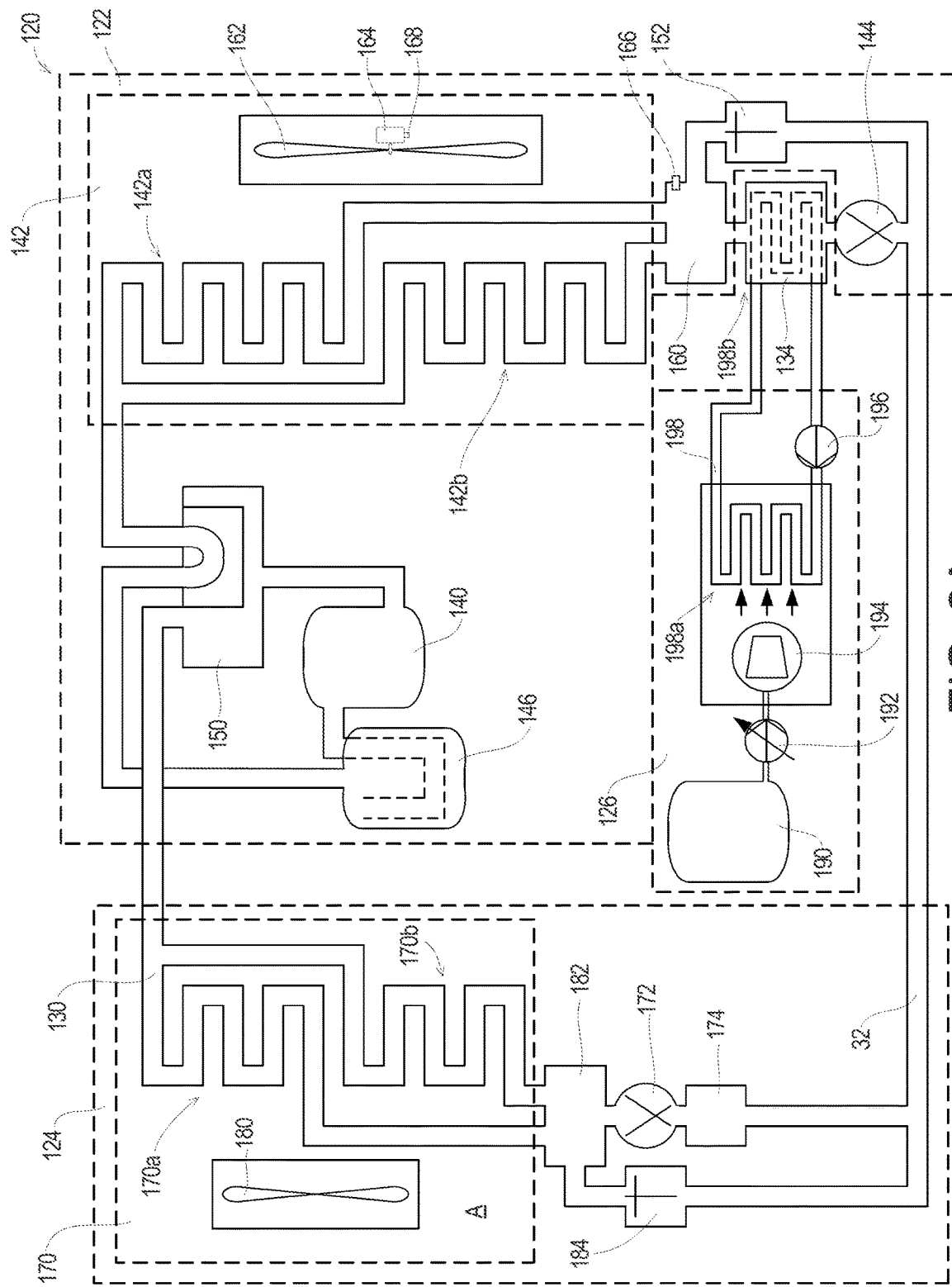
FIG. 2A is a block diagram depicting details of a second example cab heating system.
Figure 2B:
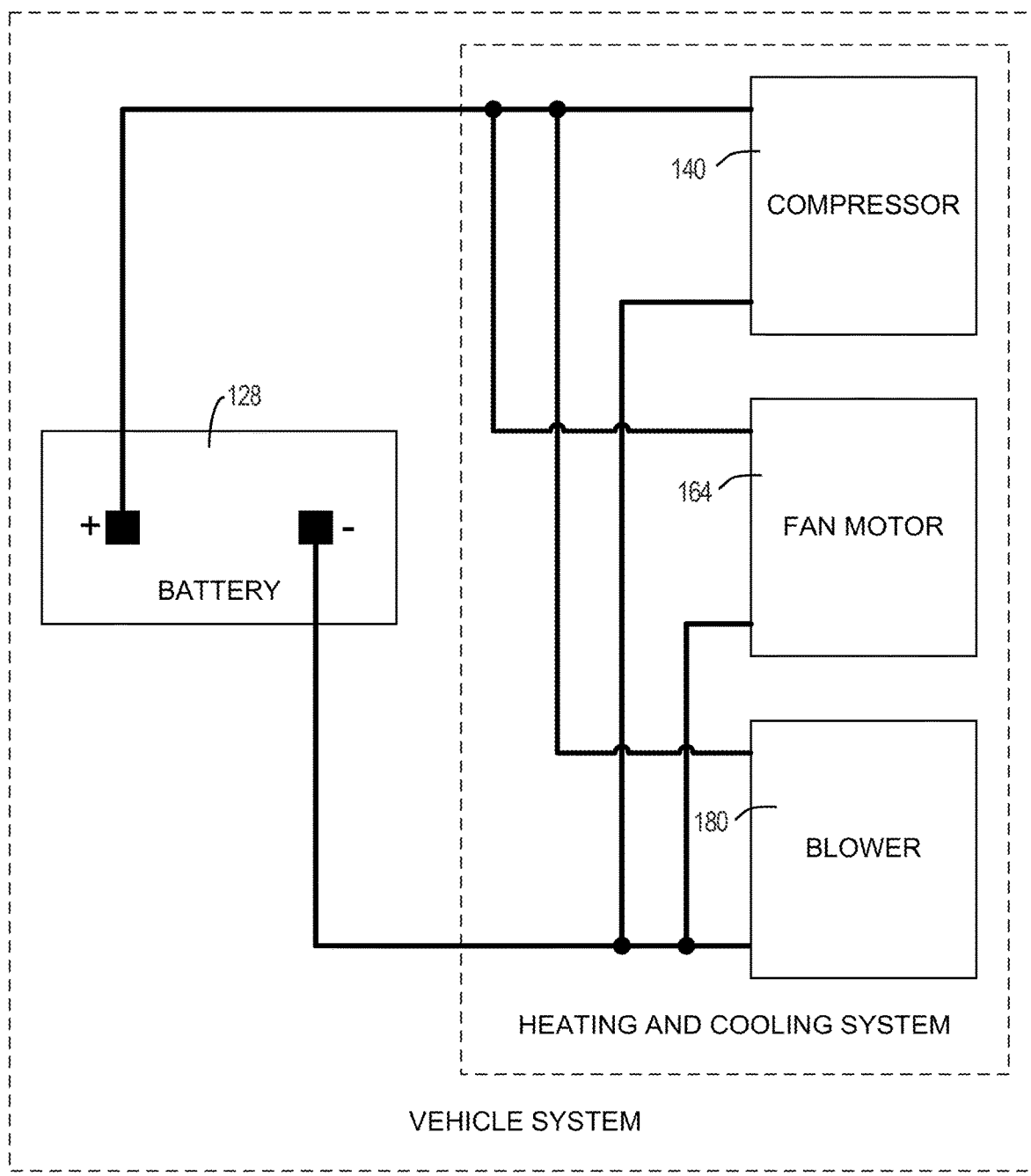
FIG. 2B is a block diagram illustrating electrical components of the second example heating system.

Referring now to FIGS. 2A and 2B of the drawing, depicted therein is a second detailed example vehicle heating and cooling system 120 of the present invention. The second example vehicle heating and cooling system 120 is capable of operating in a cooling mode and in a heating mode. In the cooling mode, heat is transferred from an interior to an exterior of the vehicle 20 on which the second example heating system 120 is mounted. In the heating mode, heat is transferred from the exterior to an interior of the vehicle 20 on which the second example heating system 120 is mounted.

The second example vehicle heating and cooling system 120 comprises a compressor system 122, an interior system 124, and an auxiliary system 126 is connected to a battery 128 (FIG. 2B). The compressor system 122 and the interior system 124 are connected together by a first main line 130 and a second main line 132. The first and second main lines 130 and 132 allow main working fluid to be circulated between the compressor system 122 and the interior system 124. The compressor system 122 and the auxiliary heating system 126 are connected together by an auxiliary heat exchanger 134 that allows heat generated by the auxiliary heating system 126 to be transferred to the main working fluid.

The compressor system 122 comprises a compressor 140, a compressor side heat exchanger or condenser 142, a compressor thermal expansion valve 144, and an accumulator 146. The example condenser 142 comprises a plurality of heat exchanger portions 142a and 142b. A reversing valve 150 and compressor check valve 152 allow the second example vehicle heating and cooling system 120 to operate in the cooling mode and in the heating mode. The compressor system 122 further comprises a compressor distributor 160, a compressor fan 162, a fan motor 164, a compressor fluid temperature sensor 166, and a motor switch 168. The compressor distributor 160 allows fluid to flow through the heat exchanger portions 142a and 142b in parallel. The compressor fan 162, fan motor 164, temperature sensor 166, and motor switch 168 operate the fan 162 based on temperature of the primary working fluid flowing between the compressor system 122 and the interior system 124.

The interior system 124 comprises an interior heat exchanger or evaporator 170, an interior thermal expansion valve 172, and a dryer 174. The example interior system 124 further comprises an interior blower 180, an interior distributor 182, and an interior check valve 184. The example evaporator 170 comprises a plurality of interior heat exchanger sections 170a and 170b. The interior blower 180 carries heat from the evaporator 170 into the interior A. In combination with the reversing valve 150 and compressor check valve 152, the interior distributor 182 and interior check valve 184 allow the second example vehicle heating and cooling system 120 to operate in the cooling mode and in the heating mode. The interior distributor 182 allows fluid to flow through the interior heat exchanger portions 170a and 170b in parallel.

In the cooling mode, the compressor system 122 and the interior system 124 operate in a conventional manner as generally described in U.S. Pat. No. 6,615,602 to Wilkinson.

The operation of the second example heating and cooling system 120 in the cooling mode will thus not be described in detail herein.

In the heating mode, the second example heating and cooling system 120 may operate in both a standard heating mode and in an augmented heating mode. In the standard heating mode, the compressor system 122 and the interior system 124 operate in a conventional manner as generally described in the U.S. Pat. No. 6,615,602. In the augmented heating mode, the heat generated by the compressor system 122 and transferred to the interior system 124 is augmented by the auxiliary heating system 126 as will now be described in detail.

In particular, the example auxiliary heating system 126 comprises a fuel tank 190, a fuel control valve 192, a turbine 194, an auxiliary fluid pump 196, and an auxiliary fluid line 198. The auxiliary fluid line 198 comprises a turbine section 198a and a heat exchanger section 198b. The turbine section 198a is located within the turbine 194, and the heat exchanger section 198b is located within the auxiliary heat exchanger 134.

The fuel tank 190 may be the main fuel tank of the vehicle on which the second example heating and cooling system 120 is mounted (e.g., diesel, gasoline) or may be a separate, auxiliary fuel tank containing the same or another type of fuel (e.g., propane). The fuel control valve 192 controls the flow of fuel from the fuel tank 190 to the turbine 194. The turbine 194 burns the fuel to generate electricity and, as a byproduct, creates waste heat. The auxiliary fluid pump 196 circulates auxiliary fluid (e.g., water) through the heating section 198a and the heat exchanger section 198b of the auxiliary fluid line 198. Heat from the turbine 194 is transferred to the auxiliary fluid in the turbine section 198a. Heat from the auxiliary fluid is transferred to the main fluid in the auxiliary heat exchanger 134. The auxiliary heating system 126 thus may be used to transfer heat to the main fluid when environmental and vehicle operation considerations do not allow the compressor system 122 efficiently to extract sufficient heat from the ambient air flowing across the compressor heat exchanger 142.

III. Third Example Vehicle Heating System

Figure 3A:
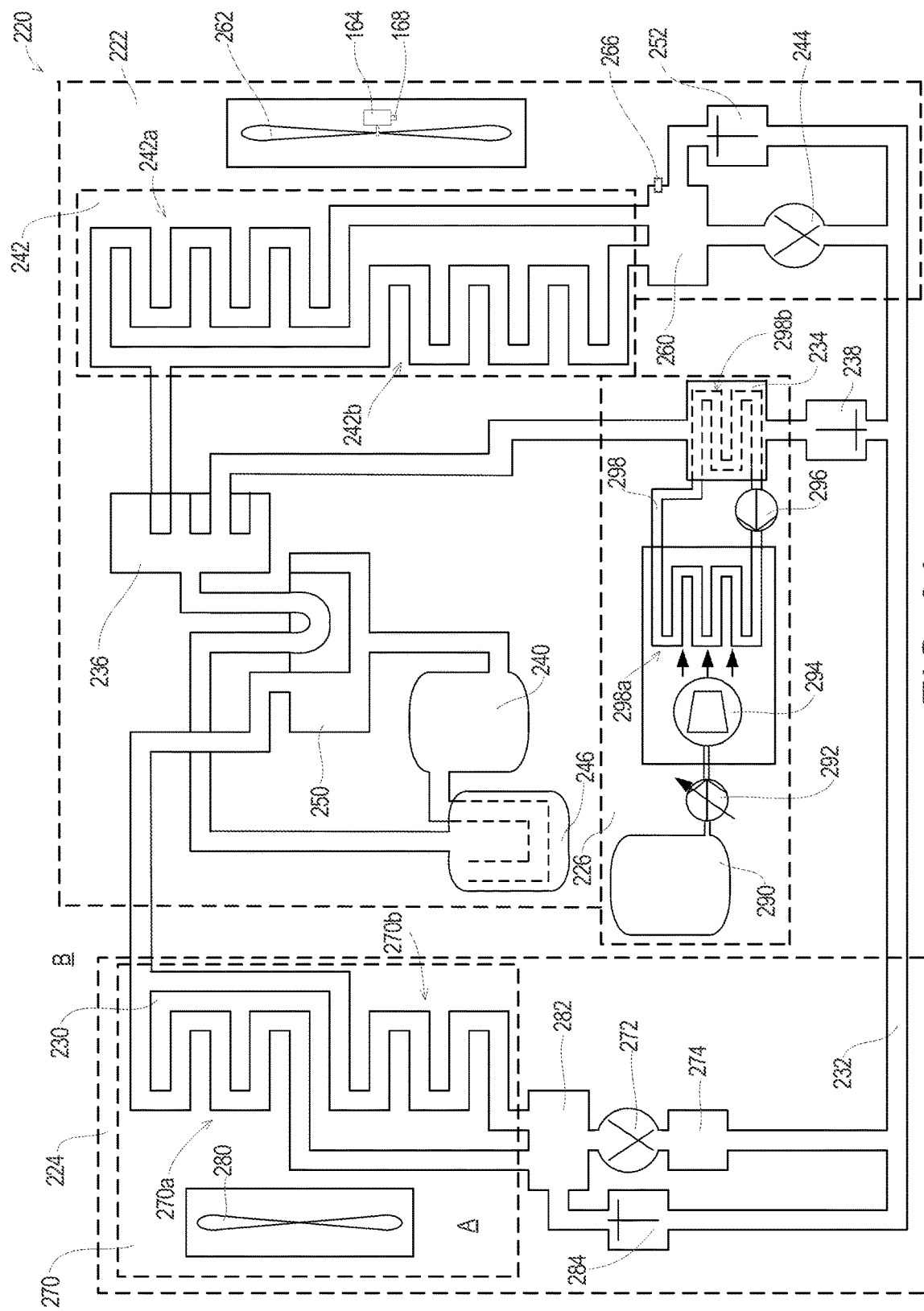
FIGS. 3A and 3B are block diagrams depicting details of a third example cab heating system operating in first and second configurations, respectively.
Figure 3B:
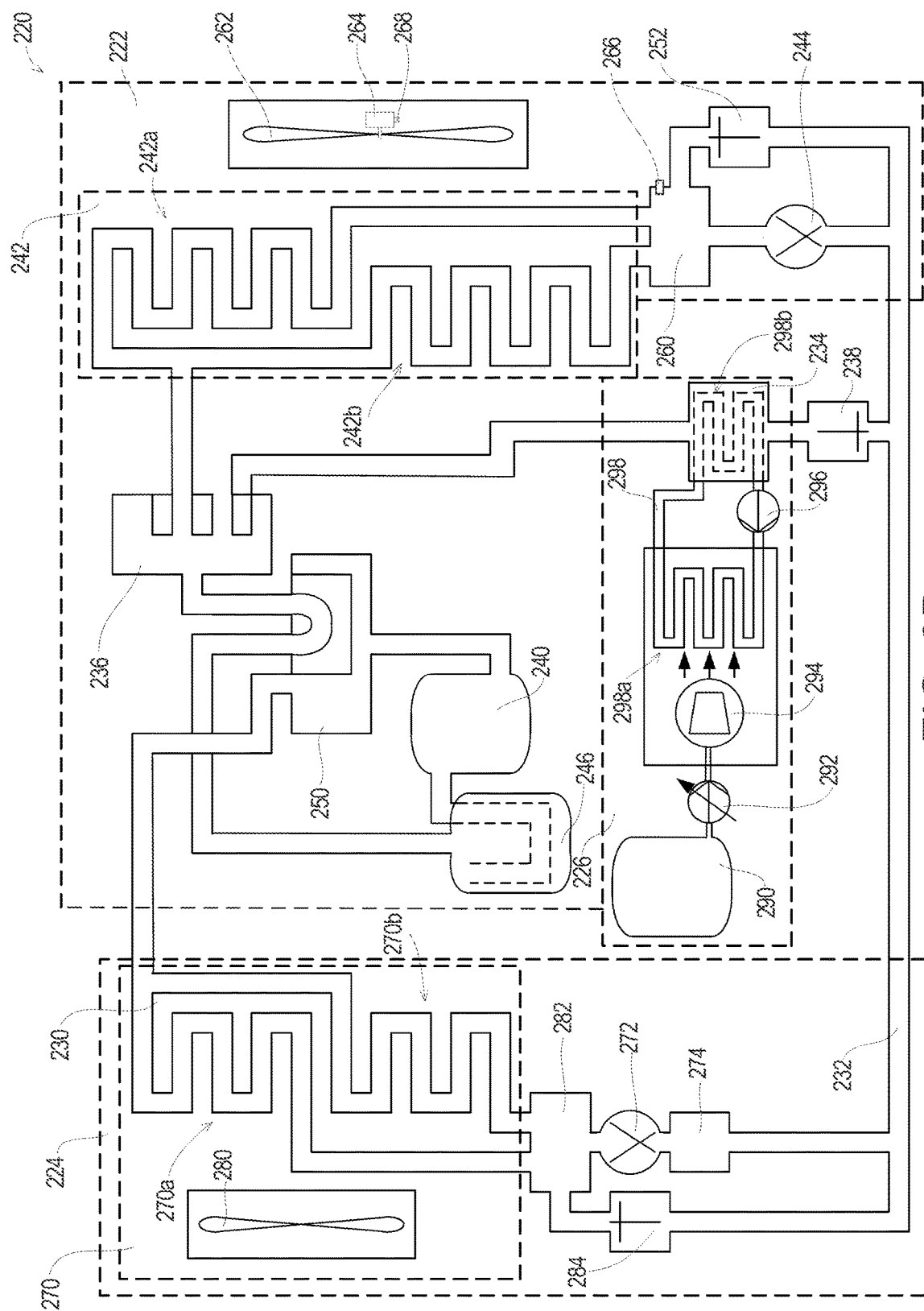

Referring now to FIGS. 3A and 3B of the drawing, depicted therein is a third example vehicle heating and cooling system 220 of the present invention. The third example vehicle heating and cooling system 220 is capable of operating in a cooling mode and in a heating mode. In the cooling mode, heat is transferred from an interior A to an exterior B of a vehicle (not shown) on which the third example heating system 220 is mounted. In the heating mode, heat is transferred from the exterior B to an interior A of the vehicle on which the third example heating system 220 is mounted. As with the first example heating and cooling system 20 described above with reference to FIG. 2, at least a portion of the power consumed by the third example heating and cooling system 220 is stored in a battery (not shown) of the vehicle 20.

The third example vehicle heating and cooling system 220 comprises a compressor system 222, an interior system 224, and an auxiliary system 226. The compressor system 222 and the interior system 224 are connected together by a first main line 230 and a second main line 232. The first and second main lines 230 and 232 allow main working fluid to be circulated between the compressor system 222 and the interior system 224. The compressor system 222 and the auxiliary heating system 226 are connected together by an auxiliary heat exchanger 234 that allows heat generated by the auxiliary heating system 226 to be transferred to the main working fluid. A control valve 236 and check valve 238 allow the third example heating and cooling system 220 to be placed in a main heating mode or an auxiliary heating mode as will be described in further detail below.

The compressor system 222 comprises a compressor 240, a compressor heat exchanger 242, a compressor thermal expansion valve 244, and an accumulator 246. The example compressor heat exchange 242 comprises a plurality of heat exchanger portions 242a and 242b. A reversing valve 250 and compressor check valve 252 allow the third example vehicle heating and cooling system 220 to operate in the cooling mode and in the heating mode. The compressor system 222 further comprises a compressor distributor 260, a compressor fan 262, a fan motor 264, a compressor fluid temperature sensor 266, and a motor switch 268. The compressor distributor 260 allows fluid to flow through the heat exchanger portions 242a and 242b in parallel. The compressor fan 262, fan motor 264, temperature sensor 266, and motor switch 268 operate the fan 262 based on temperature of the primary working fluid flowing between the compressor system 222 and the interior system 224.

The interior system 224 comprises an interior heat exchanger 270, an interior thermal expansion valve 272, and a dryer 274. The example interior system 224 further comprises an interior blower 280, an interior distributor 282, and an interior check valve 284. The example interior heat exchanger 270 comprises a plurality of interior heat exchanger sections 270a and 270b. The interior blower 280 carries heat from the interior heat exchanger 270 into the interior A. In combination with the reversing valve 250 and compressor check valve 252, the interior distributor 282 and interior check valve 284 allow the third example vehicle heating and cooling system 220 to operate in the cooling mode and in the heating mode. The interior distributor 282 allows fluid to flow through the interior heat exchanger portions 270a and 270b in parallel.

In the cooling mode, the compressor system 222 and the interior system 224 operate in a conventional manner as generally described in the U.S. Pat. No. 6,615,602. The operation of the third example heating and cooling system 220 in the cooling mode will thus not be described in detail herein.

In the heating mode, the third example heating and cooling system 220 may operate in both a standard heating mode and in an auxiliary heating mode. In the standard heating mode, the compressor system 222 and the interior system 224 operate in a conventional manner as generally described in the U.S. Pat. No. 6,615,602. In the augmented heating mode, the auxiliary heating system 226 is used instead of the compressor system 222 to transfer heat to the interior system 224 as will now be described in detail.

In particular, the example auxiliary heating system 226 comprises a fuel tank 290, a fuel control valve 292, a turbine 294, an auxiliary fluid pump 296, and an auxiliary fluid line 298. The auxiliary fluid line 298 comprises a turbine section 298a and a heat exchanger section 298b. The turbine section 298a is located within the turbine 294, and the heat exchanger section 298b is located within the auxiliary heat exchanger 234.

The fuel tank 290 may be the main fuel tank of the vehicle on which the third example heating and cooling system 220 is mounted (e.g., diesel, gasoline) or may be a separate, auxiliary fuel tank containing the same or another type of fuel (e.g., propane). The fuel control valve 292 controls the flow of fuel from the fuel tank 290 to the turbine 294. The turbine 294 burns the fuel to generate electricity and, as a byproduct, creates waste heat.

The auxiliary fluid pump 296 circulates auxiliary fluid (e.g., water) through the heating section 298a and the heat exchanger section 298b of the auxiliary fluid line 298. Heat from the turbine 294 is transferred to the auxiliary fluid in the turbine section 298a. Heat from the auxiliary fluid is transferred to the main fluid in the auxiliary heat exchanger 234. The control valve 236 and check valve 238 allow the auxiliary heating system 226 to be arranged in parallel with the compressor system 222 and thus may be used instead of the compressor system 222. The auxiliary heating system 226 thus may be used to transfer heat to the main fluid when environmental and vehicle operation considerations do not allow the compressor system 222 efficiently to extract sufficient heat from the ambient air flowing across the compressor heat exchanger 242.

What is claimed is:

1. A cab heating system for a vehicle comprising a vehicle battery, a fuel tank, and a cab HVAC system comprising a main working fluid that flows through a compressor operatively connected to the vehicle battery, a condenser, and an evaporator, the cab heating system comprising:
   a turbine engine operatively connected to the fuel tank, where the turbine engine is configured as a generator to burn fuel from the fuel tank to generate electricity for use by the vehicle battery, where the turbine engine generates exhaust containing waste heat;
   a heat exchanger comprising a first portion, a second portion, and first and second lines for carrying auxiliary working fluid between the first and second portions;
   a duct operatively connected to carry exhaust from the turbine engine to the first portion of the heat exchanger;
   wherein
   the auxiliary fluid is circulated between the first and second portions of the heat exchanger such that
      the first line carries the auxiliary working fluid to the second portion of the heat exchanger, and
      the second line carries the auxiliary working fluid to the first portion of the heat exchanger;
   the first portion of the heat exchanger transfers waste heat of the exhaust generated by the turbine engine to the auxiliary working fluid; and
   the second portion of the heat exchanger extracts heat from the auxiliary working fluid and transfers the heat extracted from the auxiliary working fluid to the main working fluid to allow waste heat of the turbine engine to be used by the cab HVAC system.

2. The cab heating system as recited in claim 1, in which the HVAC system operates in:
   a cooling mode in which heat from the auxiliary fluid is not transferred to the main working fluid; and
   a heating mode in which the heat extracted from the auxiliary working fluid is transferred to the main working fluid.

3. The cab heating system as recited in claim 2, in which the main working fluid flows first through the compressor system and then through the second portion of the heat exchanger in the heating mode.

4. The cab heating system as recited in claim 2, in which the main working fluid flows in parallel through the compressor and the second portion of the heat exchanger in the heating mode.

5. The cab heating system as recited in claim 1, in which the main working fluid flows first through the compressor and then through the second portion of the heat exchanger when heat extracted from the auxiliary working fluid is transferred to the main working fluid.

6. The cab heating system as recited in claim 1, in which the main working fluid flows in parallel through the compressor and the second portion of the heat exchanger when heat extracted from the auxiliary working fluid is transferred to the main working fluid.

7. A method of heating a cab of a vehicle comprising a vehicle battery, a fuel tank, and a cab HVAC system comprising a main working fluid that flows through a compressor operatively connected to the vehicle battery, a condenser, and an evaporator, the method comprising the steps of:
   providing a turbine engine operatively connected to the fuel tank, where the turbine engine is configured as a generator to burn fuel from the fuel tank to generate electricity for use by the vehicle battery;
   providing a heat exchanger comprising a first portion and a second portion;
   operatively connecting a duct to carry exhaust from the turbine engine to the first portion of the heat exchanger;
   operating the turbine engine to generate exhaust containing waste heat such that the first portion of the heat exchanger transfers waste heat of the exhaust generated by the turbine engine to the auxiliary working fluid;
   circulating the auxiliary fluid between the first and second portions of the heat exchanger such that
      the first line carries the auxiliary working fluid to the second portion of the heat exchanger, and
      the second line carries the auxiliary working fluid to the first portion of the heat exchanger;
   causing the first portion of the heat exchanger to transfer heat from the waste exhaust of the turbine engine to the auxiliary working fluid;
   causing the second portion of the heat exchanger to extract heat from the auxiliary working fluid and transfer the heat extracted from the auxiliary working fluid to the main working fluid to allow waste heat of the turbine engine to be used by the cab HVAC system.

8. The method as recited in claim 7, further comprising the step of operating the cab HVAC system in:
   a cooling mode in which heat from the auxiliary fluid is not transferred to the main working fluid; and
   a heating mode in which the heat extracted from the auxiliary working fluid is transferred to the main working fluid.

9. The method as recited in claim 7, further comprising the steps of:
   causing the main working fluid to flow through the cab HVAC system; and
   causing the main working fluid to flow through the second portion of the heat exchanger when heat extracted from the auxiliary working fluid is transferred to the main working fluid.

10. The method as recited in claim 7, further comprising the steps of:
    causing the main working fluid to flow through the cab HVAC system; and
    causing the main working fluid to flow through the second portion of the heat exchanger in the heating mode.

11. The method as recited in claim 7, further comprising the step of causing the main working fluid to flow in parallel through the cab HVAC system and the second portion of the heat exchanger when heat extracted from the auxiliary working fluid is transferred to the main working fluid.

12. The method as recited in claim 7, further comprising the step of causing the main working fluid to flow in parallel through the cab HVAC system and the second portion of the heat exchanger in the heating mode.

13. A vehicle heating and cooling system for a vehicle comprising a vehicle battery and a fuel tank, the vehicle heating a cooling system comprising:
- a turbine engine generator operatively connected to the fuel tank, where the turbine engine is configured as a generator to burn fuel from the fuel tank to generate electricity for use by the vehicle battery, and exhaust containing waste heat;
- a heat exchanger comprising a first portion and a second portion;
- a compressor, where the vehicle battery is operatively connected to the compressor;
- an evaporator;
- an evaporator; and
- a duct operatively connected to carry exhaust from the turbine engine to the first portion of the heat exchanger;
wherein
auxiliary working fluid circulates between the first portion of the heat exchanger and the second portion of the heat exchanger;
the first portion of the heat exchanger transfers waste heat of the exhaust generated by the turbine engine to the auxiliary working fluid;
the second portion of the heat exchanger extracts heat from the auxiliary working fluid and transfers the heat extracted from the auxiliary working fluid to main working fluid flowing between the compressor and the evaporator to allow waste heat of the turbine engine to be used to heat at least a portion of the vehicle.

14. The vehicle heating and cooling system as recited in claim 13, in which the compressor and the evaporator operate in:
- a cooling mode in which heat from the auxiliary fluid is not transferred to the main working fluid; and
- a heating mode in which the heat extracted from the auxiliary working fluid is transferred to the main working fluid.

15. The vehicle heating and cooling system as recited in claim 13, in which the main working fluid flows first through the compressor and then through the second portion of the heat exchanger when heat extracted from the auxiliary working fluid is transferred to the main working fluid.

16. The vehicle heating and cooling system as recited in claim 14, in which the main working fluid flows first through the compressor and then through the second portion of the heat exchanger in the heating mode.

17. The vehicle heating and cooling system as recited in claim 14, in which the main working fluid flows in parallel through the compressor and the second portion of the heat exchanger when heat extracted from the auxiliary working fluid is transferred to the main working fluid.

18. The vehicle heating and cooling system as recited in claim 14, in which the main working fluid flows in parallel through the compressor and the second portion of the heat exchanger in the heating mode.

* * * * *